July 16, 1957  L. W. WATERS  2,799,311
PEACH PITTER
Original Filed Feb. 24, 1948  5 Sheets-Sheet 1

INVENTOR.
LAWRENCE W. WATERS
BY
Mellin and Hanscom
ATTORNEYS

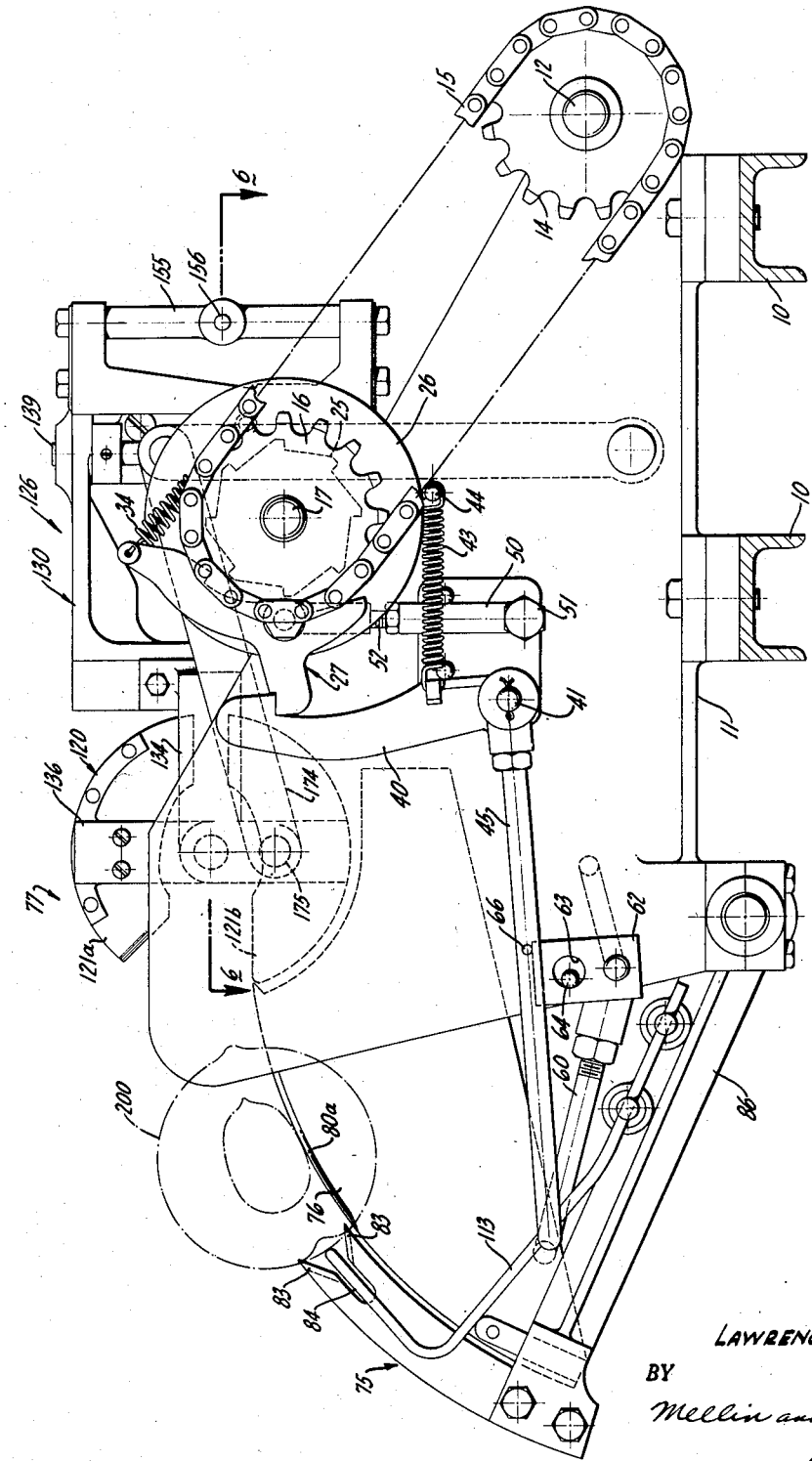

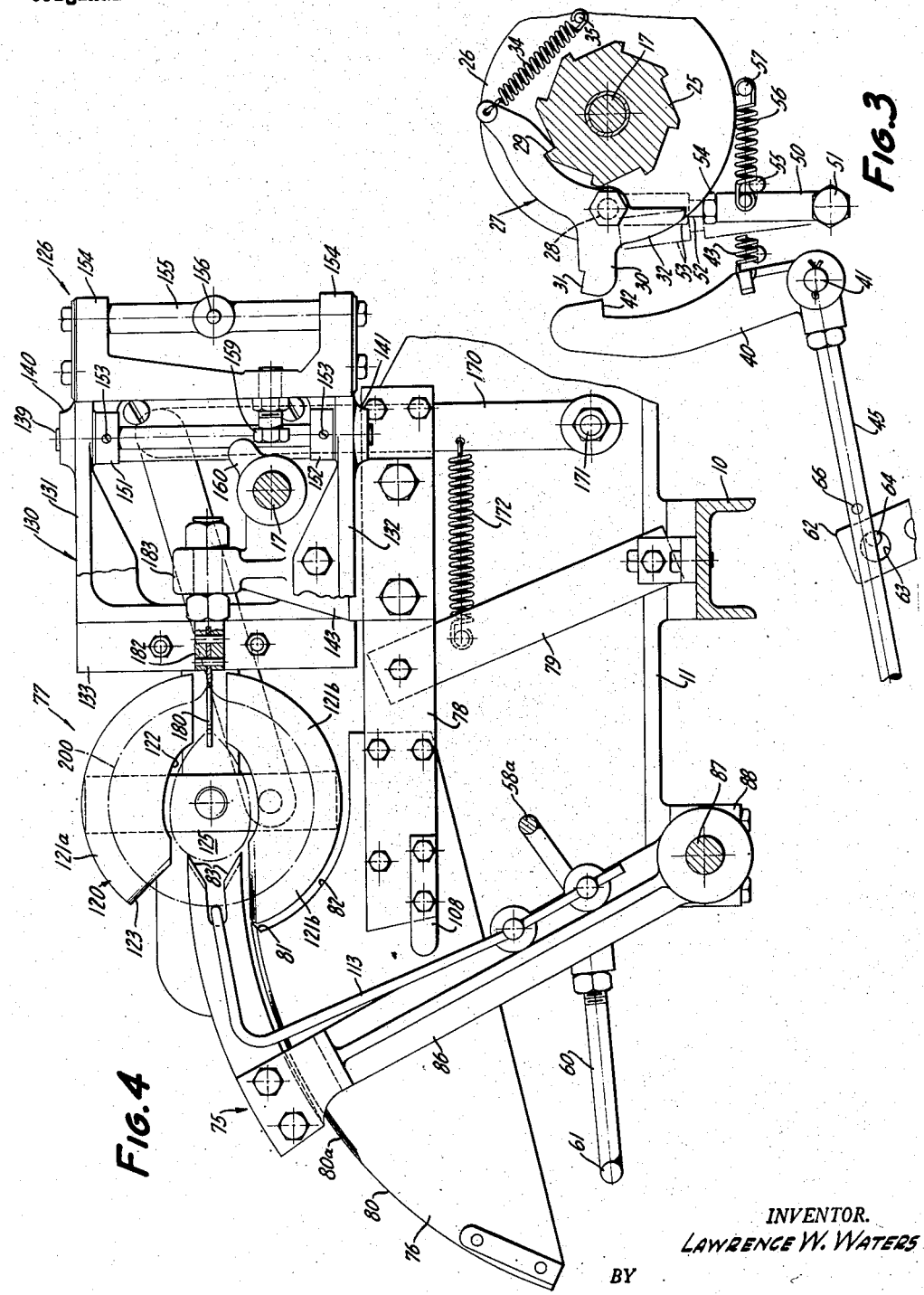

July 16, 1957 L. W. WATERS 2,799,311
PEACH PITTER

Original Filed Feb. 24, 1948 5 Sheets-Sheet 4

INVENTOR.
LAWRENCE W. WATERS
BY
Mellin and Hanscom
ATTORNEYS

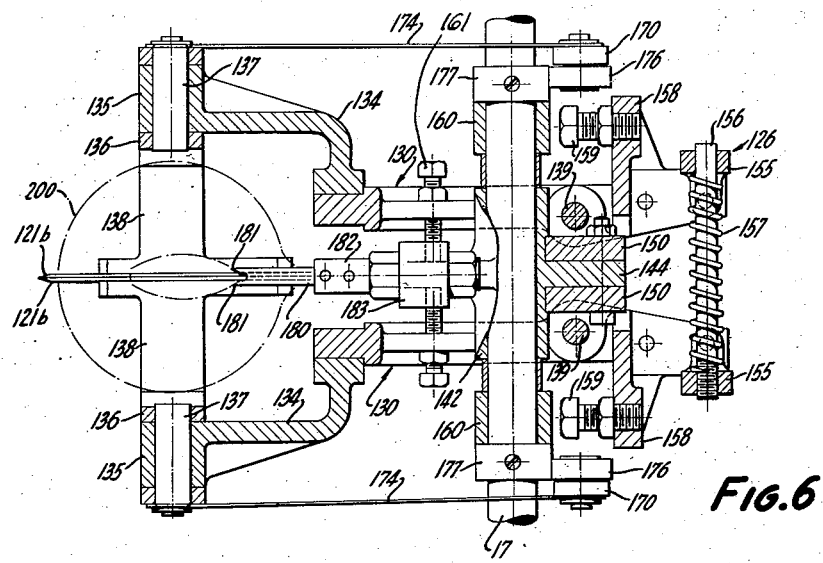

ered July 16, 1957

United States Patent Office 2,799,311
Patented July 16, 1957

2,799,311
PEACH PITTER

Lawrence W. Waters, Ontario, Calif., assignor to United Can & Glass Company, Oakland, Calif., a corporation of Delaware Continuation of application Serial No. 10,291, February 24, 1948. This application July 17, 1953, Serial No. 368,567

10 Claims. (Cl. 146—28)

This invention relates to a pitting machine, and in particular to a machine for separating and cutting peaches and other like drupaceous fruits into halves and separating the pit or stone from the halves.

This application is a continuation of my copending application Serial No. 10,291, now abandoned, which in turn was filed as a continuation-in-part of my then copending application Serial No. 576,467, filed February 6, 1945, and now issued into Patent No. 2,531,927, granted November 28, 1950.

In the preparation of fruit for canning and particularly drupaceous fruits, which include peaches, cherries and the like, it is necessary to cut the fruit into halves without shredding or tearing the meat and to remove the pit from each of the halves without undue loss of meat or flesh. These operations must be carried out rapidly and effectively, since even a single pit in a large batch of canned, pitted fruit gives rise to much unfavorable comment. It therefore becomes highly desirable to provide a pitting machine which will operate to such a degree of accuracy and efficiency that it will mechanically grip the pit or stone until the halves of the meat have been torn from it and thereafter reject the pit by itself. Moreover, since unskilled help is employed and great quantities of fruit must be handled, the machine must be rugged, fool-proof, easily serviced, and easily operated.

In my application Serial No. 576,467 above referred to, there is described a pitting machine in which are provided an operating shaft, an impaling element, a stationary fruit guide or blade and a pair of sprocketed spreader blades. The apparatus is further provided with a single revolution clutch which operates, when engaged, to rotate the operating shaft through one revolution, during which an impaled fruit is brought forward on the guide blade into the socket, the meat is cut away from the pit, and the two halves are separated from the pit, which is dropped into a suitable receptacle or conveyor positioned below the apparatus.

It is an object of the present invention to provide improvements on the apparatus described and claimed in my copending application which make for safer and more dependable operation.

It is a further object of the invention to provide a smoother, more accurately timed and dependable operation of the impaling element.

It is a further object of the invention to provide a safer means of actuating the impaling element.

It is a still further object of the invention to provide a cleaner and more efficient separation of the halves of the fruit from the pit.

These and other objects of the invention will be apparent from the ensuing description and the appended claims.

The invention will be better understood by reference to the accompanying drawings.

Referring now to the drawings:

Fig. 2 is a side elevation of the apparatus of the invention.

Fig. 3 is a detailed view of the clutch mechanism, taken along the line 3—3 of Fig. 1.

Fig. 4 is a longitudinal cross section taken along the line 4—4 of Fig. 1.

Fig. 6 is a horizontal mid-section of the spreader mechanism taken along the line 6—6 of Fig. 2 and showing it in closed position.

Fig. 7 is a plan view of the spreader mechanism, showing it in open position.

Figure 1:
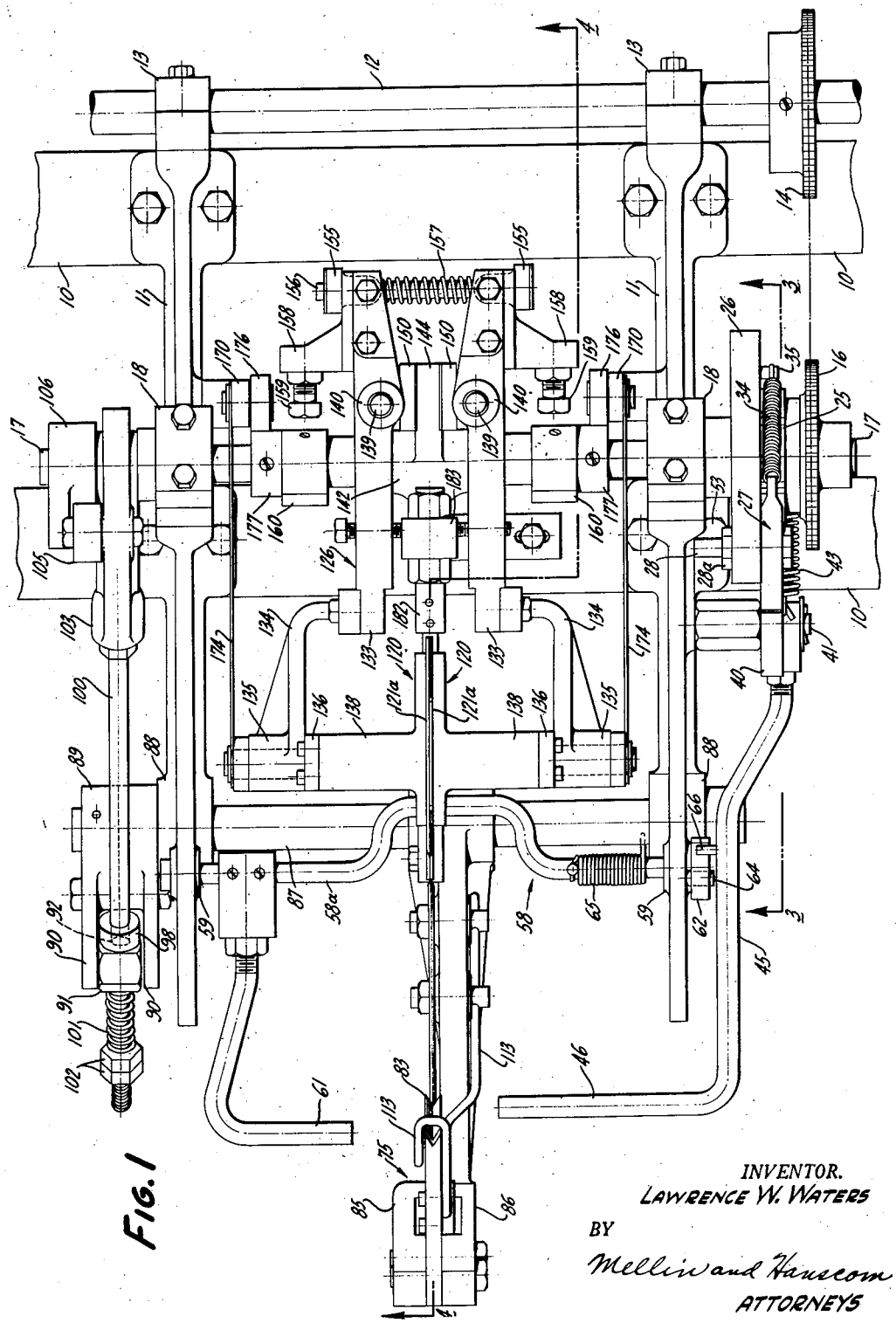
Fig. 1 is a plan view of the apparatus of the invention.

Referring now to various figures of the drawings, and more particularly to Figs. 1 and 2, the main framework of the apparatus comprises two transverse channel members 10, to which are bolted two spaced bearing brackets 11. The channel members may be carried on spaced beams (not shown) positioned over a bin or conveyor (not shown), and a battery of similar units may be mounted on the same beams and operated by a common drive shaft.

Power for operating the apparatus is derived from a drive shaft 12, journalled in bearings 13 which are integral with brackets 11. Keyed to the drive shaft 12, opposite one of the bearings 13, is a sprocket wheel 14 engaging a drive chain 15 which is looped about and engages a second sprocket wheel 16, which is rotatably mounted on an operating shaft 17. The operating shaft 17 is journalled in bearings 18, which are integral with brackets 11. It is the motion of operating shaft 17 which imparts the desired motions to the various elements of the apparatus, as described hereinafter.

The drive shaft 12 rotates continuously; likewise, the sprocket 16 on the operating shaft 17. Rotary motion is imparted to the operating shaft 17 by means of the sprocket 14, the chain 15 and the sprocket 16 in the manner now to be described, with particular reference to Figs. 2 and 3.

Rigidly secured to the sprocket 16, on the inner side thereof, is a ratchet wheel 25. Adjacent the ratchet wheel 25 and keyed to the operating shaft 17 is a disc 26. A pawl 27 is pivoted to the disc 26 by means of a threaded pivot pin 28 in threaded engagement with disc 26. The pin 28 is adjustable and is locked in place by a lock nut 28a, and it extends outwardly somewhat from the lock-nut for a purpose described hereinafter. The pawl 27 is provided with a shoulder 29 for engaging the teeth of the ratchet wheel 25, and it is also provided with a laterally extended finger 30 having a recessed engaging surface 31, and with a downwardly extending finger 32. A spring 34 secured at one end to the end of pawl 27 opposite the fingers 30 and 32 and at the opposite end to a pin 35 located in disc 26, acts to urge the shoulder of the pawl into engagement with the ratchet wheel 25. Normally, however, the pawl 27 is held out of engagement with the ratchet wheel 25 by means of a dog 40 fulcrumed on a pin 41 located in bracket 11. Dog 40 is provided with a shoulder 42 which engages the surface 31 of finger 30. A spring 43, secured at one end to the dog 40 and at its opposite end to a pin 44 located in bracket 11, exerts sufficient tension on the dog 40 in a clockwise direction, as viewed in Fig. 2, to overbalance the tension of spring 34, with the result that the pawl 27 is normally held out of engagement with the ratchet wheel 25. An operating lever 45, bent inwardly at its outer end to provide a handle 46, is secured to the lower end of the dog 40.

It will be seen that a single revolution clutch is thus provided. Upon depressing the handle 46, the dog 40 will be forced out of engagement with the pawl 27, which will then be urged by the spring 34 into engagement with the ratchet wheel 25, thereby locking the disc 26 to the ratchet wheel and imparting rotary motion to the operating shaft 17. Upon subsequent release of the handle 46, the dog 40 will be urged back into its normal position by the spring 43, and, when the disc and pawl have completed one revolution, the surface 31 of the pawl will again engage the shoulder of the dog 40 and will be brought to a stop.

To provide against reverse motion of the disc and operating shaft, there is also provided a column 50 pivoted on a pin 51 located in bracket 11. The column 50 is internally threaded and it carries, in threaded engagement, an adjustable bolt 52 provided with a cap or head 53 and with a lock nut 54. The column 50 is normally urged against a stop pin 55 located in bracket 11, by a spring 56 secured at one end to the column 50 and at the opposite end to a pin 57, also located in bracket 11. As the operating shaft 17 and disc 26 rotate clockwise, is indicated by the arrow in Fig. 3, the pivot pin 28 of pawl 27 brushes against the head 53 of column 50, pushing it outwardly as shown in broken lines. Once, however, pin 28 has cleared head 53 and surface 31 of the pawl engages shoulder 42 of the dog, the column 50 will be brought back to its normal upright position, in which pin 28 will bear against the top of head 53. Reverse motion of the disc 26 and operating shaft 17 is thus prevented.

A locking or tripping means generally designated as 58 is also provided to lock the operating lever 45 in its normal upward position to prevent the dog 40 from disengaging the pawl 27. This locking means comprises a shaft 58a journaled in bearings 59 integral with brackets 11, the shaft 58a being bent inwardly at its mid-portion to avoid other parts of the apparatus. A lever 60 having a handle 61 is secured to the shaft 58a near one end thereof, and at the opposite end, externally of the adjacent bracket 11, there is provided a locking plate 62 which is keyed to shaft 58a and is provided with a relatively large opening 63, through which projects a limit pin 64 secured in and extending outwardly from the adjacent bracket 11. A spring 65 is coiled about the shaft 58a and secured thereto at one end, having its opposite, free end bearing against the top of a shaft 87. The spring 65 acts to rotate the shaft 58a in a clockwise direction, as viewed in Fig. 2, to bring the locking plate 62 to bear against a pin 66 secured to and projecting inwardly from the lever 45.

It will be seen that the operating lever 45 is normally locked against downward movement. Upon depressing the lever 60, the locking plate 62 will disengage the pin 66, and the operating lever 45 may then be depressed to disengage the dog 40 from the pawl 27. There is thus provided a factor of safety in the operation of the apparatus, since the operator must use both hands, one on operating lever 45 and the other on locking lever 60 to initiate operation of the apparatus. Otherwise, a careless operator might have his free hand on the impaler 75 (described hereinafter) at the commencement of operation.

Figures 5, 9:
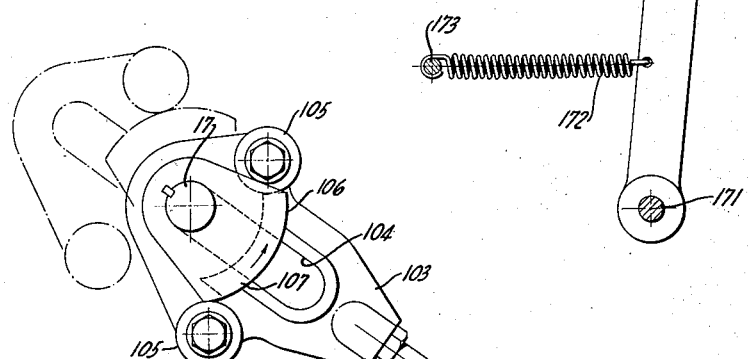
Fig. 5 is a detailed view of the mechanism for actuating the impaling element.
Fig. 9 is a vertical mid-section of the spreader blade mechanism.

The operative parts of the apparatus which accomplish the pitting and halving operations, and whose operations are controlled by the operating shaft 17, the clutch and the operating lever 45 described above, are an impaler 75, a stationary fruit guide blade 76 and a spreader blade mechanism 77. The stationary fruit guide blade 76 is supported upon the main framework by supporting brackets 78 and 79, as shown in Fig. 4. Blade 76 has an upwardly curving edge 80 of circular radius, the upper half of which is sharpened to a knife edge 80a. The right hand or rearward portion of blade 76 is recessed forwardly and downwardly to provide a projecting tip 81, overlapping the spreader blade mechanism, and a recess 82 to receive the spreader blade mechanism. The fruit impaler 75 is in the form of a curved pronged member provided with upper and lower double prongs 83 and with a notch 84 at the pronged end thereof. The impaler is bolted at its opposite end between a guide member 85 and the top portion of an arm 86, the lower end of which is keyed to the midportion of a shaft 87. The shaft 87 is journaled in bearings 88 integral with the brackets 11, and it projects outwardly through the bearings 88 located on the side of the apparatus opposite the operating lever 45. Keyed to the projecting end of shaft 87 is a crank 89 having projecting arms 90. A block 91 provided with a bore 92 is journaled in and located between the arms 90. A connecting rod 100 is slidably received within the bore 92 and is limited in its downward movement by the collar 98 and set screw 99. Encircling the lower end of rod 100 is a spring 101 which is secured in place and is compressed to the proper tension by nuts 102 screwed onto the threaded lower end of the rod. To the opposite end of rod 100, as best shown in Fig. 5, is secured a cam follower 103 provided with a longitudinal slot 104, and with two rollers 105 which project radially and outwardly from opposite sides of the follower, one such roller being offset relative to the other in the direction of the axis of rod 100. A cam 106, generally in the form of a sector and having an engaging groove 107, is keyed to the operating shaft 17.

It will be seen that, as the operating shaft 17 rotates, the cam 106 will engage, first one, then the other of the followers 103, thus imparting to the rod 100 a reciprocating motion which, in turn, through the crank 89, will impart to the shaft 87 an oscillating rotary motion, first in clockwise direction as viewed in Fig. 2, and then in counterclockwise direction. These movements of the shaft 87 will cause the arm 86 and the impaler 75 to oscillate through an arc, from the retracted position as shown in Fig. 2 to the forward or extended position shown in Fig. 4. A stop member 108 bolted to the fruit guide blade 76 is provided to limit the travel of arm 86 and impaler 75, to prevent lost motion during the dwell of the cam 106. An additional factor of safety is provided by the spring 101 above mentioned. In the event that a fruit having an exceptionally large pit is impaled, the forward motion of the impaler 75 may be blocked by the pit before the impaler reaches its normal, forward limit against stop member 108. To prevent damage to the prongs 83 and to other parts of the apparatus in this event, the spring 101 is provided. Thus, in the event that a large pit blocks the impaler before it has reached its normal limit, further forward movement of the connecting rod 100 merely slides the rod through the block 92 by compressing the spring 101, without further rotation of the crank 89.

For a purpose described hereinafter, there is secured to the impaler actuating arm 86 a spring 113, which, as shown in Figs. 1 and 2, extends along one side of the impaler 75 and is bent to pass through the slot 84, thence rearwardly along a portion of the opposite side of the impaler.

The spreader blade mechanism 77, referred to above, comprises an opposing, vertically disposed pair of spreader blades 120, each of which consists of two spaced, upper and lower crescent shaped blade members 121a and 121b having their concave, sharpened edges 122 opposing one another. The blade members 121a and 121b have generally the same shape, but the leading edge 123 of each upper member 121a slants forwardly and downwardly in a radial direction, then continues horizontally, while the leading edge 124 of each lower member 121b slants upwardly a short distance, thence continues horizontally. The spreader blades 120, in their normal position, are adjacent one another and substantially in the plane of the fruit guide blade 76, with the slanting portion of the forward edges 124 underlying the tip 81 of guide blade 76 in overlapping relation, and with the lower blade members 121b within the recess 82 of guide blade 76. It will be seen that the spreader blades 120 thus define a fruit receiving socket 125 in alignment with the impaler 75 and the guide blade 76.

Each pair of spreader blades 120 is supported by a framework generally designated as 126. This framework is shown in plan view in Fig. 1, and in open position in Fig. 7, and it is also shown in horizontal mid-section in Fig. 6 and in vertical mid-section in Fig. 9.

Referring to these various figures, the main elements of the supporting framework 126 are two generally U-shaped castings 130, each having upper and lower legs 131 and 132 and a base portion 133; an arm 134 secured to the mid-portion of the base 133 and extending, first outwardly from the base 133 a short distance, thence forwardly; a hub or sleeve 135 positioned at and integral with the forward end of arm 134 and in alignment with the axis of the spreader blades 120; a cross-beam 136 normally perpendicular to the arm 134 and keyed to a shaft 137 journaled in the hub 135; and a pair of spaced, opposing brackets 138 each in the form of a short section of a rather wide channel beam, one leg of each bracket being bolted to the cross-beam 136 and the opposite leg, to a spreader blade 121a or 121b. The position of the brackets 138 and their inner legs is such as to clear the sharpened edges 122 of the blades 121a and 121b by a wide margin so as to avoid interference with the cutting operation.

Each framework 126 is pivoted on a vertical shaft 139 journaled in bearings 140 and 141 which are integral, respectively, with the upper and lower legs 131 and 132 of the casting 130. A collar or sleeve 142 in which the operating shaft 17 is journaled, is provided with a forwardly and downwardly extending bracket 143 and a rearwardly extending bracket 144 extending both above and below the shaft 17. To each side of the rearward bracket 144 is bolted a bearing bracket 150 provided with upper and lower bearings 151 and 152, respectively. Each pivot shaft 139 passes through the upper and lower bearings 151 and 152 of one or the other of the bearing brackets 150, and set screws 153 in the bearings 151 and 152, secure the pivot shafts 139 thereto against rotation.

Bolted to a bracket 154 between the upper and lower legs 131 and 132 of each casting 130, at the rearward end of the casting, is a column 155 bored transversely at its central portion to slidably receive a keeper rod 156 extending between the columns 155. The keeper rod 156 is threaded in one of the columns 155 and extends slidably through the opposite column, and it is encircled between the columns 155 by a spring 157, which, being under tension, pivots the forward ends of the castings 130, and with them the spreader blades 120, toward each other so as normally to hold the spreader blades in contact. An outwardly directed extension 158 of each bracket 154 is provided with a forwardly extending contact button 159, and opposite each button 159 is provided a cam 160 keyed to the operating shaft 17.

It will be seen that, as the operating shaft 17 rotates, each cam 160 engages the opposing button 159, with the result that the castings 130 are pivoted against the tension of the spring 157, thus spreading apart the spreader blades 120. When the engaging surfaces of the cams 160 pass the buttons 159, the spring 157 will act to pivot the castings 130 toward one another and to bring the spreader blades 120 together again. Two adjustable stop screws 161 threaded through the lower legs 132 of the castings 130, bear against the rearward bracket 144 and serve to locate the spreader blades 120 relative to the center line of the machine.

Figure 8:
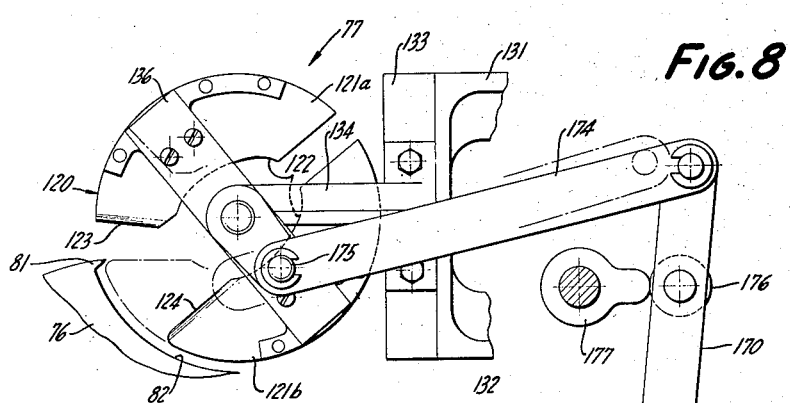
Fig. 8 is a detailed, elevational view of a spreader blade and the means of revolving it.

An additional, rotary movement is also imparted to the spreader blades 120 during their spreading movement, by means of a lever 170 associated with each spreader blade 120. Each lever 170, best shown in Figs. 4 and 8, is pivoted at its lower end to the adjacent bearing plate 11 at 171, as shown, and it is normally urged in a forward or counterclockwise direction by a spring 172 secured at one end to the lever and at its opposite end to the bearing plate 11 at 173. The upper end of the lever 170 is connected to one end of a link 174, the opposite end of which is eccentrically connected to the adjacent spreader blade 120 by attachment to the lower member 121b at 175. An inwardly projecting cam follower 176 and roller, as best shown in Figs. 1 and 8, is secured to the lever 170. Opposing each roller 176 is a cam 177 keyed to the operating shaft 17.

It will be seen that, during rotation of the operating shaft, the cam 177 will, upon engaging the roller 176, urge the lever 170 from its normal position, as shown in dot-dash lines in Fig. 8, to its extended position, as shown in full lines, and acting through the eccentric link 174, will rotate the spreader blades 120 counterclockwise from their normal position, as shown in dot-dash lines, to the position shown in full lines.

The apparatus is also provided with a fruit chuck 180 in the form of a pronged member having tips 181 at its forward end and pinned at its opposite end to a stud 182 bolted to an extension 183 of the bracket 143.

In operation of the apparatus, and with the impaler 75 in its normal, retracted position, as shown in Fig. 2, a fruit 200, such as a peach, is impaled on the tips 83 of the impaler, with the cleft in contact with the tips and the suture in a vertical plane. The locking lever handle 61 is then depressed and the operating lever handle 46 is depressed, thereby releasing the dog 40 from the pawl 27 and causing the latter to engage the ratchet wheel 25, thus engaging the ratchet with the operating shaft 17 and causing it to rotate through one revolution, until the pawl 27 is in position to engage the dog 40 again. During this rotation, the action of the cam 106 causes reciprocation of the connecting rod 100, which imparts an oscillating movement of the shaft 87 and of the impaler 75. During its upward sweep, the impaler 75 carries the fruit along the knife edge 80a of the fruit guide blade 76 and into the socket 82 between the blade members 121 and 121b of the spreader blades 120. The impaler 75 then retracts to its initial position. Meanwhile, the cams 160 on the operating shaft 17 engage the buttons 159, thus causing spreading of the spreader blades 120. At the same time, the cams 177 on the operating shaft actuate the levers 170, thus imparting rotation to the spreader blades.

The function of the spring 113 secured to the impaler 75 is to disengage the pit from the prongs 83 of the impaler. Normally, as when a fruit is impaled as shown in Fig. 2, the spring 113 is in a forward or extended position bearing against the skin of the fruit. When the impaler is in its advanced position as shown in Fig. 4, the spring 113 is in a retracted position. When the two halves of the fruit have been separated, the spring 113 will be returned to its normal, extended position and, in so doing, will strike and disengage the pit from the prongs 83.

The design of the cams and associated elements, and the timing of the various movements are such that the spreader blades 120 remain closed and in the position shown in Fig. 6 until the impaler 75 has reached its limit, as shown in Fig. 4, and has lodged the fruit firmly within the socket 82 so that the spreader blades 120 will have cut into the fruit. The dwell of the cam 106 is also such that the impaler 75 will remain in this extended position for a short period while the spreader blades 120 are spreading and rotating. Further, the spreading and rotating movements of these blades are timed to commence simultaneously and to continue concurrently. By this means an important advantage is obtained, in that the simultaneous spreading and twisting movements of the spreader blades more effectively and cleanly separate the meat of the fruit from the pit. The separated, halved meat and the pit drop below the machine onto any suitable conveyor or into a bin provided for the purpose.

It will thus be apparent there has been provided a pitting machine or apparatus which is smoother and more dependable in its operation and which provides certain important safety factors against injury to the operator and to the machine. Thus, the operator, requiring both hands to initiate operation of the machine cannot carelessly have one hand in the way of the moving apparatus when it is in motion. Also, the action of the impaling element is smooth, efficient and dependable. In particular, the spreader blades more cleanly, efficiently and dependably perform the halving operation and separation of the meat from the pit.

While I have shown the preferred form of my invention, it is to be understood that various changes may be made in its construction by those skilled in the art without departing from the spirit of the invention as defined in the appended claims.

Having thus described my invention, what I claim as new and desire to secure by Letters Patent is:

1. In a fruit pitting machine comprising an impaling element for impaling the fruit and propelling it to a halving station, a halving member for halving the fruit, said halving member comprising a pair of adjacent socketed blades, means including said impaling element for holding the stone of the fruit, and means for holding the blades stationary and together as a fruit is lodged therein by the impaling element and for thereafter spreading the blades apart to separate the halved meat from the stone, the improvement which comprises means for imparting to the socketed blades a rotary movement about an axis extending substantially centrally through the socket area of the blades at right angles to the plane of the cutting edges of the blades during the spreading thereof.

2. A fruit pitting machine, comprising a supporting frame, a rotatable shaft mounted thereon, an impaling element pivoted to move through an arc from a retracted position to an advanced position, means operatively connecting said impaling element with said shaft to advance and retract the impaling element through said arc, a pair of socketed blades having sharpened socket edges, said socketed blades being normally so positioned as to receive a fruit from the impaling element when in its advanced position, means including said impaling element for holding the stone of the fruit against movement, and means operatively connecting said blades with said shaft for holding the blades stationary and together as a fruit is lodged therein by the impaling element and thereafter for imparting to the blades a spreading movement and a rotating movement about an axis extending through the socket area of the blades normal to the plane of the cutting edges of said blades whilst the impaling element is in its advanced position.

3. A fruit pitting machine, comprising a supporting frame, a rotatable operating shaft mounted thereon, clutch means adapted to connect said operating shaft with a driving shaft, said clutch means being normally disengaged but operative, upon engagement, to cause a single revolution of the operating shaft and to disengage at the end of said single revolution, an impaling element pivoted to sweep through an arc from a retracted position to an advanced position, means operatively connecting said impaling element to said operating shaft and operative to advance the impaling element from its retracted position to its advanced position and to return the same to its retracted position during one revolution of the operating shaft, a halving member comprising opposing socketed blades having sharpened socket edges and normally positioned in alignment with the impaling element so as to receive impaled fruit when the impaling element is in its advanced position, means including said impaling element for holding the stone of the fruit against movement, and means operatively connecting said socketed blades with said operating shaft operative to spread the blades and to rotate the blades about an axis extending through the socket area of the blades and parallel to the direction of the spreading movement of the blades, while the impaling element is in its advanced position and to return the blades to their normal position for the next cycle of operation.

4. The machine of claim 3, including a stationary guide blade having an arced, sharpened edge so positioned and aligned as to cut the fruit as it is advanced by the impaling element and to guide the fruit into the socket formed by the socketed blades.

5. The machine of claim 4, wherein said guide blade is arced upwardly from the retracted position of the impaling element to the socketed blades, and the impaling element is pivoted to swing upwardly and concentrically with the guide blade.

6. A peach pitter comprising a pair of substantially flat, plate-like blades arranged in face-to-face relationship and formed with sockets to receive a peach, said blades being mounted for oscillatory movement toward and away from one another and for rotary movement about an axis transverse to the plane of the adjacent blades, an impaling element adapted to impale a peach and mounted for oscillatory movement toward and away from the socket formed in the blades, means including said impaling element for holding the stone of the fruit against movement, means for oscillating the impaling element, means for oscillating the blades, means for rotating the blades about an axis extending through the socket area of the blades at right angles to the plane of their cutting edges, and timing means for holding said blades in closed position as said impaling element lodges a peach therein, for spreading said blades apart and simultaneously rotating them after a peach has been so lodged and for returning said impaling element to retracted position and for closing said blades before commencement of a new cycle of operations.

7. A peach pitter comprising a pair of substantially flat, socketed, plate-like blades arranged in face-to-face relationship with their sockets in alignment to provide in effect a single socket for receiving a peach, said blades being mounted for arcuate oscillatory movement toward and away from one another and for arcuate oscillatory movement about a transverse axis extending through the socket area of the blades normal to the plane thereof, an impaling element mounted for arcuate oscillatory movement toward and away from said socket to lodge an impaled peach therein, a rotatable drive-shaft, means operatively connecting the same with said impaling element to oscillate the impaling element, means operatively connecting the drive-shaft with said blades to oscillate the same toward and away from each other, means operatively connecting the drive-shaft to the blades to oscillate the blades about said transverse axis, timing means operatively associated with said connecting means for holding said blades in closed position as an impaled peach is lodged therein, spreading the blades apart and simultaneously rotating them after a peach has been so lodged, for returning the impaling element to retracted position and for closing the plates before commencement of a new cycle of operations, and means including said impaling element for holding the stone of the fruit against movement while the fruit is being cut.

8. A fruit pitting machine comprising means for impaling a peach and holding the pit thereof, a pair of socketed knives arranged side-by-side, means for causing the knives to engage an impaled peach, said knives being so dimensioned that sockets thereof will contain the pit of the peach but not the meat thereof so that the meat is cut when the knives engage a peach, means for rotating the knives in unison about a common transverse axis extending through the socket area of the knives at right angles to the plane of the cutting edges thereof to cause the knives to partially circumnavigate the pit or stone of the peach, and means for causing the knives to separate during the rotation thereof to thereby separate the meat of the peach from the pit.

9. A fruit pitting machine comprising means for impaling a fruit and holding the pit or stone thereof, a pair of socketed knives arranged side-by-side, means for moving the knives into engagement with the impaled fruit, means for rotating the knives in unison about an axis disposed at right angles to the plane of the cutting edges of the knives and located approximately at the center of curvature of the cutting edges of the socketed knives to cause the knives to partially circumnavigate the pit or stone of the fruit, and means for causing the knives to simultaneously laterally separate during the rotation thereof to thereby separate the meat of the fruit from the pit or stone.

10. In a fruit pitting machine comprising an impaling element provided with spaced prongs having sharpened impaling tips adapted to impale a fruit at an impaling station and pitting means adapted to receive the fruit and to halve and pit the same, an arm supporting the impaling element and movable to advance the fruit from the impaling station to the pitting station, the improvement which comprises a spring arm provided with a pit-dislodging member disposed between the tips of the impaling element in a position to be engaged by the meat of the fruit when impaled upon the impaling element, the pit-dislodging member being displaced by engagement with the meat of the fruit against the spring resistance of the arm means and thereafter when the meat is removed springing forwardly to dislodge the pit of the fruit from the impaling element.

References Cited in the file of this patent

UNITED STATES PATENTS

| | | |
|---|---|---|
| Re.17,726 | Duncan | July 8, 1930 |
| 915,658 | Burns | Mar. 14, 1909 |
| 921,523 | Dunkley | May 11, 1909 |